(12) United States Patent
Suzuki et al.

(10) Patent No.: US 7,845,934 B2
(45) Date of Patent: Dec. 7, 2010

(54) PLASTIC MOLDING DIE

(75) Inventors: Fumiyuki Suzuki, Kanagawa (JP); Tadashi Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 520 days.

(21) Appl. No.: 11/320,596

(22) Filed: Dec. 30, 2005

(65) Prior Publication Data

US 2006/0157834 A1 Jul. 20, 2006

(30) Foreign Application Priority Data

Jan. 19, 2005 (JP) ............................. 2005-011769

(51) Int. Cl.
*B29D 11/00* (2006.01)
*B29C 33/50* (2006.01)
(52) U.S. Cl. .................. 425/411; 425/127; 425/408; 425/416; 425/808; 425/DIG. 47; 65/305
(58) Field of Classification Search ............... 425/127, 425/193, 195, 352, 353, 384, 395, 408–411, 425/415, 423, 451.9, 808, 412, 416, DIG. 44, 425/47, 414, DIG. 47, 403; 264/1.24, 1.32, 264/1.38, 2.2, 325, 320, 2.5; 65/29.12, 305
See application file for complete search history.

(56) References Cited

U.S. PATENT DOCUMENTS

| | | | | | |
|---|---|---|---|---|---|
| 1,680,823 | A | * | 8/1928 | Teed | 264/241 |
| 2,233,057 | A | * | 2/1941 | Luce | 65/305 |
| 2,294,589 | A | * | 9/1942 | Waterbury | 264/275 |
| 3,720,491 | A | * | 3/1973 | Dedek | 425/78 |
| 3,733,159 | A | * | 5/1973 | Coffman | 425/186 |
| 3,825,378 | A | * | 7/1974 | Dart et al. | 425/4 R |
| 4,121,896 | A | * | 10/1978 | Shepherd | 425/412 |
| 4,166,088 | A | * | 8/1979 | Neefe | 264/1.38 |
| 4,591,373 | A | * | 5/1986 | Sato | 65/29.19 |
| 4,732,553 | A | * | 3/1988 | Hofer | 425/116 |
| 4,786,444 | A | * | 11/1988 | Hwang | 264/1.38 |
| 4,895,585 | A | * | 1/1990 | Angenent et al. | 65/39 |
| 4,929,265 | A | * | 5/1990 | Carpenter et al. | 65/64 |

(Continued)

FOREIGN PATENT DOCUMENTS

JP 60-112408 A 6/1985

(Continued)

OTHER PUBLICATIONS

Japanese Patent Office Action received Feb. 2, 2010.

*Primary Examiner*—Philip C Tucker
*Assistant Examiner*—Dimple N Bodawala
(74) *Attorney, Agent, or Firm*—Sughrue Mion, PLLC

(57) ABSTRACT

A plastic molding die provided with a cavity where a plastic material is put in, wherein a part of an inner surface of the cavity is configured with an elastic body. A molding portion corresponding to a molding surface of a molded product is disposed on the inner surface of the cavity, and the elastic body is arranged on a portion other than the molding portion of the inner surface of the cavity. The plastic molding die may be a molding die for compression molding. The elastic body is made of rubber, and has an upper temperature limit higher than a glass-transition temperature of the plastic material. The degree of rubber hardness of the elastic body is from 50 to 100.

17 Claims, 5 Drawing Sheets

U.S. PATENT DOCUMENTS

| | | | | |
|---|---|---|---|---|
| 5,460,503 A | * | 10/1995 | Kitajima et al. | 425/116 |
| 5,662,951 A | * | 9/1997 | Greshes | 425/384 |
| 5,700,416 A | * | 12/1997 | Masui et al. | 264/325 |
| 5,853,627 A | * | 12/1998 | Watanabe | 264/2.3 |
| 6,799,361 B2 | * | 10/2004 | Frasl | 29/594 |
| 7,065,985 B2 | * | 6/2006 | Yamanaka | 65/305 |
| 2005/0212154 A1 | * | 9/2005 | Inoue et al. | 264/1.32 |
| 2006/0202369 A1 | * | 9/2006 | Foreman et al. | 264/1.32 |

FOREIGN PATENT DOCUMENTS

| | | | |
|---|---|---|---|
| JP | 62-292640 A | * | 12/1987 |
| JP | 62297119 A | * | 12/1987 |
| JP | 62297120 A | * | 12/1987 |
| JP | 04-294126 A | | 10/1992 |
| JP | 07-112443 A | | 5/1995 |
| JP | 2000-25120 A | | 1/2000 |
| JP | 2000-246738 A | | 9/2000 |
| JP | 2005-193653 A | | 7/2005 |

* cited by examiner

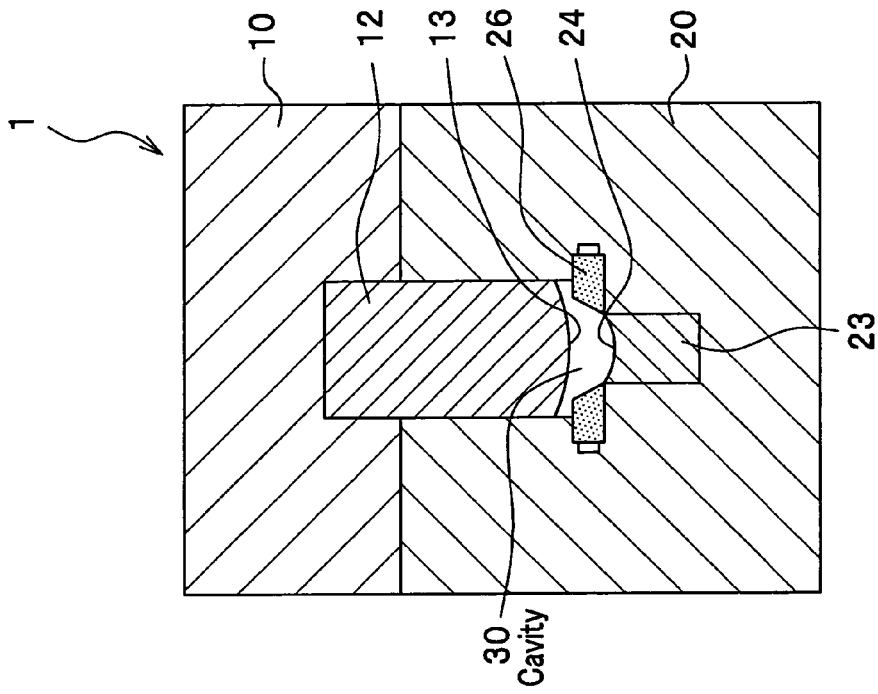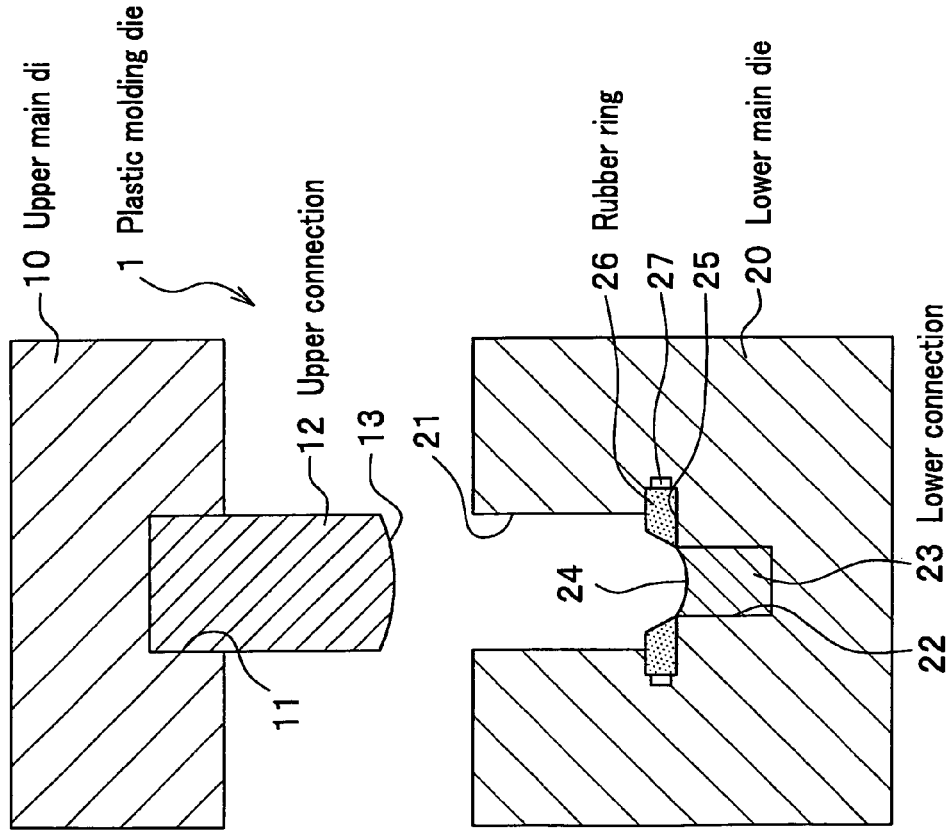

PLASTIC MOLDING DIE

CROSS REFERENCE TO RELATED APPLICATIONS

This application claims the foreign priority benefit under Title 35, United States Code, §119(a)-(d) of Japanese Patent Application No. 2005-011769, filed on Jan. 19, 2005, the contents of which are hereby incorporated by reference.

BACKGROUND OF THE INVENTION

1. Technical Field of the Invention

The present invention relates to a plastic molding die for molding a plastic material.

2. Description of the Related Art

As a plastic molding die for manufacturing a plastic lens with compression molding, using a plastic material, there is a plastic molding die which is configured so that a cavity is formed between each connection mounted on each main die of the plastic molding die when the each main die, an upper main die and a lower main die, is combined to each other.

In the plastic molding die, a plastic material is put in a space between the connections mounted on each main die when the each main die is separated to each other, and the plastic material is processed with compression molding within the cavity by combining the upper main die and the lower main die after heating up the material to a temperature equal to or higher than a glass-transition temperature for softening the plastic material. This is disclosed in, for example, Japanese Laid-Open Patent Application No. 2000-25120 (paragraph [0007]-[008], and FIG. 1).

Here, the plastic material is taken out from the cavity after cooling the material to a temperature equal to or less than the glass-transition temperature because the softened plastic material is likely to be deformed if a temperature of the plastic material is higher than the glass-transition temperature when a molded material is taken out from the cavity. A plastic material drastically changes its volume at around the glass-transition temperature. Then, when the plastic material is cooled within the cavity, since the material shrinks within the cavity, thereby the material separates from an inner surface of the cavity, a molding accuracy of the plastic material becomes poor.

Therefore, in the plastic molding die described in the above, the die is configured so that the plastic material is maintained to be contacted with the inner surface of the cavity by displacing the connection toward the cavity, thereby maintaining a stress of the plastic material when the molded plastic material is cooled within the cavity. Namely, a volume of the cavity is reduced by displacing the connection according to shrinkage of the plastic material when the material is cooled.

However, in the above plastic molding die, a driving unit for displacing the connection must be built in the main die as well as a necessity of a control unit for displacing the connection according to a volume change of the plastic material. As a result, the die becomes complex.

In addition, regarding a product which is molded with the above method, a dimension of the product in a displacement direction of the connection may be varied. Therefore, the method can not be applied to a product of which dimension in the displacement direction is important.

It is therefore requested for the present invention to provide a plastic molding die which can solve the aforementioned issues, and can improve a molding accuracy of a plastic material without making the molding die complex.

SUMMARY OF THE INVENTION

To solve the aforementioned issues, according to a first aspect of the present invention, there is provided a plastic molding die provided with a cavity where a plastic material is put in, wherein a part of an inner surface of the cavity is configured with an elastic body.

Here, the plastic molding die according to the present invention is configured so that the plastic material is molded within the cavity, and a molding method of the plastic molding die is not limited to, for example, injection molding and compression molding.

In addition, a characteristic of the plastic material is not limited, and the material is to be selected by considering a manufacturing product. For example, for manufacturing an optical element such as a lens and the like, plastic materials such as polycarbonate, acryl, cyclic polyolefin, and modified polyester can be used.

As described above, in the plastic molding die according to the present invention, a part of the inner surface of the cavity is configured with the elastic body. Therefore, the elastic body deforms outward of the cavity by a stress of the plastic material saturated within the cavity in the molding of the plastic material. At the time, a restoring force of the elastic body works on the plastic material in the cavity. As a result, a pressurized state of the plastic material is maintained by the restoring force of the elastic body even if the plastic material shrinks within the cavity by cooling. With this configuration, a close contact of the plastic material with the inner surface of the cavity can be maintained when the material is cooled, without building any driving unit and control unit in the molding die for reducing a volume of the cavity when the plastic material is cooled.

Meanwhile, any material can be used for the elastic body regardless of a characteristic, a shape, and a degree of hardness of the material if the material has a restoring force for maintaining the pressurized state of the plastic material when the plastic material is cooled. For example, a rubber material can be used.

According to a second aspect of the present invention, there is provided a plastic molding die, wherein a molding portion corresponding to a molding surface of a molded product may be disposed on the inner surface of the cavity, and wherein the elastic body may be arranged on a corresponding portion other than the molding portion of the inner surface of the cavity.

Like the above, in the plastic molding die of the present invention, the elastic body is arranged on a surface of the inner surface of the cavity other than the molding surface of the plastic material, that is, the elastic body is arranged on the surface other than the molding surface where a highly accurate shape of a product is requested. Thus, since the molding surface is not configured with a soft and unstable elastic body, an accurate molding of a mold surface of the plastic material can be achieved.

According to a third aspect of the present invention, there is provided a plastic molding die, wherein the plastic molding die may be a molding die for compression molding.

In the plastic molding die of compression molding according to the present invention, since a pressurized state of the plastic material is maintained by the restoring force of the elastic body within the cavity even if the plastic material shrinks by cooling after compression molding, a status of close contact of the plastic material with the inner surface of the cavity is maintained. With this configuration, an improvement of the molding accuracy can be achieved in the compression molding of the plastic material without making the molding die complex.

According to a fourth aspect of the present invention, there is provided a plastic molding die, wherein the elastic body may have an upper temperature limit higher than a glass-transition temperature of the plastic material.

In the plastic molding die of the present invention, since the elastic body has the upper temperature limit higher than the glass-transition temperature, the plastic body can be prevented from degradation due to heat even if the plastic material is molded by heating up the material to a temperature higher than the glass-transition temperature.

Meanwhile, any material can be used for the elastic body if the material has the upper temperature limit higher than the glass-transition temperature of the plastic material, and the material is to be selected by considering the glass-transition temperature of the plastic material for the molding. For example, a fluorocarbon rubber and a silicone rubber may be used.

According to a fifth aspect of the present invention, there is provided a plastic molding die, wherein the elastic body may be made of rubber, and a degree of rubber hardness of the elastic body is from 50 to 100.

In the plastic molding die of the present invention, by setting the degree of rubber hardness of the elastic body made of rubber material from 50 to 100, the restoring force of the elastic body effectively works on the plastic material when the plastic material is cooled. Therefore, it is ensured to compress the plastic material with the elastic body. Meanwhile, since the restoring force of the elastic body remarkably works on the plastic material if the degree of rubber hardness is from 70 to 100, it is preferable to set the degree of rubber hardness from 70 to 100.

In the plastic molding die described in the above, a part of the inner surface of the cavity is configured with the elastic body, and the restoring force of the deformed elastic body works on the plastic material in the cavity during the molding of the plastic material. Therefore, the pressurized state of the plastic material is maintained even if the plastic material shrinks by cooling within the cavity. As a result, the close contact of the plastic material with the inner surface of the cavity is maintained, thereby resulting in the improvement of the molding accuracy of the plastic material without making the molding die complex.

BRIEF DESCRIPTION OF THE DRAWINGS

The aspects of the present invention will become more apparent by describing in detail illustrative, non-limiting embodiments thereof with reference to the accompanying drawings, in which:

FIG. 1A is a side cross sectional view of a plastic molding die showing each main die being separated to each other, according to an embodiment of the present invention;

FIG. 1B is a side cross sectional view of the plastic molding die showing each main die being engaged with each other, according to the embodiment;

DESCRIPTION OF THE PREFFERED EMBODIMENT

Next, an embodiment of the present invention will be explained in detail by referring to figures.

Figure 2A:
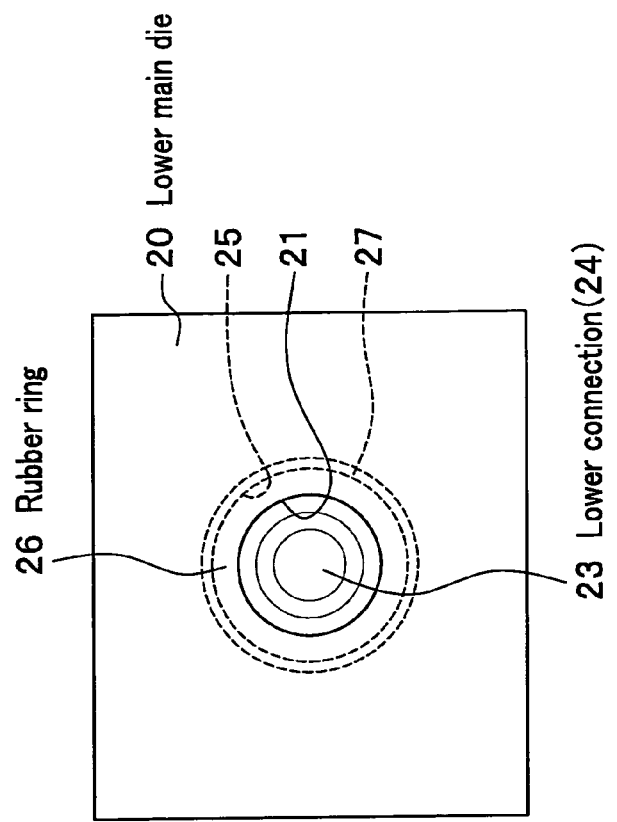
FIG. 2A is a plane view showing an upper main die of the plastic molding die according to the embodiment.
Figure 2B:
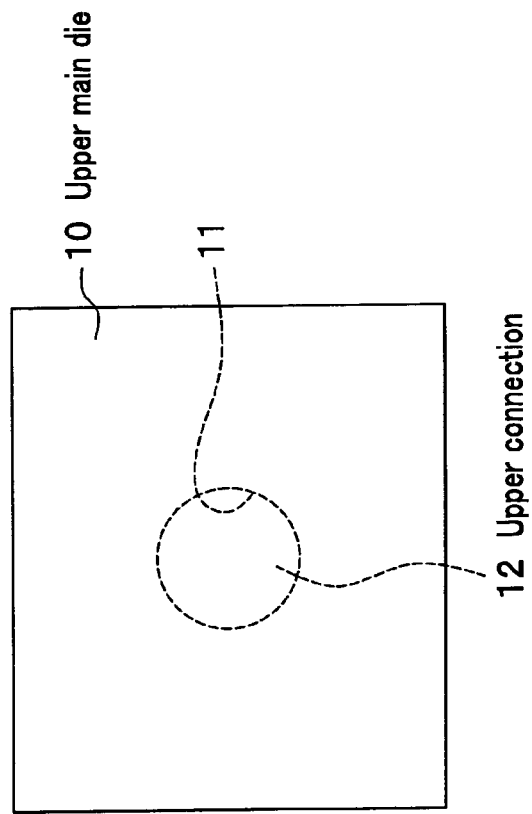
FIG. 2B is a plane view showing a lower main die of the plastic molding die according to the embodiment.

FIGS. 1A and 1B are views showing a plastic molding die according to an embodiment of the present invention. FIG. 1A is a side cross sectional view showing each main die being separated to each other, of a plastic molding die according to the embodiment. FIG. 1B is a side cross sectional view showing each main die being engaged with each other, of the plastic molding die according to the embodiment. FIGS. 2A and 2B are views showing the plastic molding die according to the embodiment. FIG. 2A is a plane view showing an upper main die of the plastic molding die according to the embodiment. FIG. 2B is a plane view showing a lower main die of the plastic molding die according to the embodiment.

In the embodiment, an example for manufacturing a plastic lens with compression molding of a plastic material will be used for explaining the present invention.

(Configuration of Plastic Molding Die)

Plastic molding die 1 is configured, as shown in FIG. 1, so that a plastic material put in a space of cavity 30, which is provided between upper main die 10 and lower main die 20, is processed with compression molding by combining upper main die 10 and lower main die 20 arranged in upper and lower positions, respectively.

(Configuration of Upper Main Die)

Upper main die 10 is, as shown in FIG. 1A and FIG. 2A, a rectangular solid made of steel, and has concave portion 11 with a circular cross section at a center of the bottom surface.

An upper end of upper connection 12, which is a circular cylinder made of steel, is engaged with concave portion 11 of upper main die 10. That is, upper connection 12 is protruded downward from the bottom surface of upper main die 10.

Bottom end surface 13 of upper connection 12 is a molding portion for molding a concave optical surface, and has a convex surface, for example, a spherical surface and the like corresponding to a curvature of the concave optical surface.

(Configuration of Lower Main Die)

Lower main die 20 is, as shown in FIG. 1A and FIG. 2B, a rectangular solid made of steel, and provided with inserting hole 21 with a circular cross section at a center of the upper surface. Inserting hole 21 has a diameter a little larger than a diameter of upper connection 12 of upper main die 10 so as to be able to insert upper connection 12 into the hole. A depth of inserting hole 21 is deeper than a protruded distance of upper connection 12 from the bottom surface of upper main die 10 so as to form a space between a bottom surface of inserting hole 21 and bottom end surface 13 of upper connection 12 when upper connection 12 is inserted into inserting hole 21 (refer to FIG. 1B).

At a bottom surface of inserting hole 21, concave portion 22 with a circular cross section having a diameter smaller than the diameter of inserting hole 21 is provided. Lower connection 23, which is a cylinder made of steel, is engaged with concave portion 22.

Upper end surface 24 of lower connection 23 is configured to be coplanar with the bottom surface of inserting hole 21. Upper end surface 24 is a molding portion for molding a convex optical surface, and has a concave bowing surface, for example, a spherical surface and the like corresponding to a curvature of the convex optical surface.

On an inner side face of a bottom portion of inserting hole 21, engagement groove 25 of a concave groove with a rectangular cross section is circularly disposed along an outer perimeter of the bottom surface. An outer perimeter of rubber ring 26 made of an elastic body is engaged with engagement groove 25 in circles, and a bottom surface of rubber ring 26 is contacted with that of inserting hole 21.

In addition, on an inner side face of engagement groove 25, clearance groove 27 of a concave groove with a rectangular cross section is circularly disposed along engagement groove 25 as a clearance groove so that rubber ring 26 is able to be sufficiently deformed in response to a pressure from an inside of inserting hole 21.

(Configuration of Rubber Ring)

Rubber ring 26 in the embodiment is made of a heat resistant rubber having an upper temperature limit higher than a glass-transition temperature of a plastic material to be used for the molding. Meanwhile, a material of the heat resistant rubber is not limited, for example, a fluorocarbon rubber and a silicone rubber can be used. In addition, a degree of rubber hardness of rubber ring 26 is from 70 to 90. The rubber ring 26 may be provided with a unitary construction, as clearly shown in FIG. 2B.

An inner diameter of rubber ring 26 is configured to be narrowed with reaching to a lower end opening portion from an upper end opening portion of rubber ring 26, and the diameter of the lower end opening portion is the same with a diameter of upper end surface 24 of lower connection 23. With the above configuration, the all area of upper end surface 24 of lower connection 23 can be seen from the opening of rubber ring 26. In addition, an outer diameter of rubber ring 26 is configured so that an outer side perimeter of rubber ring 26 is contacted with the inner side perimeter of engagement groove 25

(Configuration of Cavity)

Cavity 30 is, as shown in FIG. 1B, a space formed between a bottom surface of inserting hole 21 and bottom end surface 13 of upper connection 12 at a bottom portion of inserting hole 21 when upper main die 10 and lower main die 20 are combined by lowering upper main die 10 toward lower main die 20, thereby inserting upper connection 12 of upper main die 10 into inserting hole 21 of lower main die 20. That is, cavity 30 is a space for molding a plastic material with compression molding.

An upper inner surface of cavity 30 is configured with bottom end surface 13 of upper connection 12, and a bottom inner surface of cavity 30 is configured with upper end surface 24 of lower connection 23. In addition, rubber ring 26 is arranged at a part of an inner perimeter side surface of cavity 30.

Like the above, rubber ring 26 is arranged on a portion of the inner surface of cavity 30 other than bottom end surface 13 of upper connection 12 and upper end surface 24 of lower connection 23. Namely, rubber ring 26 is arranged on a portion other than the molding portion for molding an optical surface, of the inner surface of cavity 30.

(Manufacturing Method of Plastic Lens Using Plastic Molding Die) Next, a plastic lens manufacturing method using plastic molding die 1 according to the embodiment will be explained.

Figure 3A:
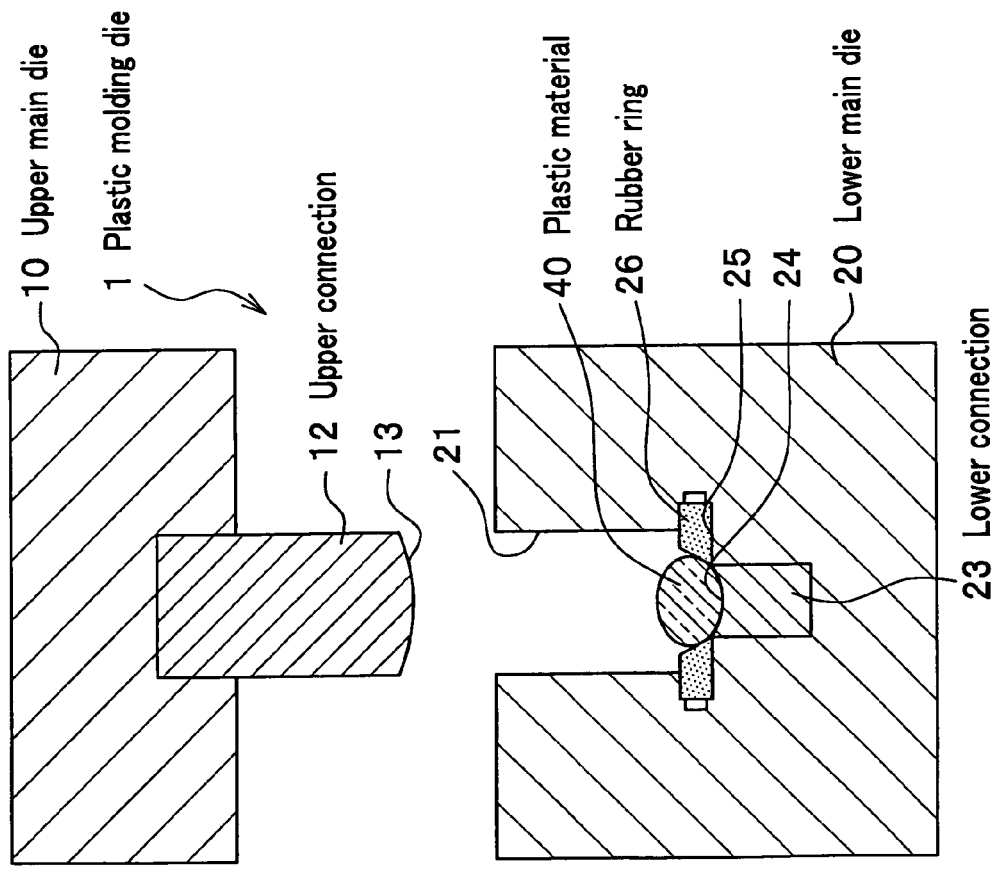
FIG. 3A is a side cross sectional view showing a status where a plastic material is put in a plastic molding die, in a plastic lens manufacturing method using the plastic molding die according to an embodiment of the present invention.
Figure 3B:
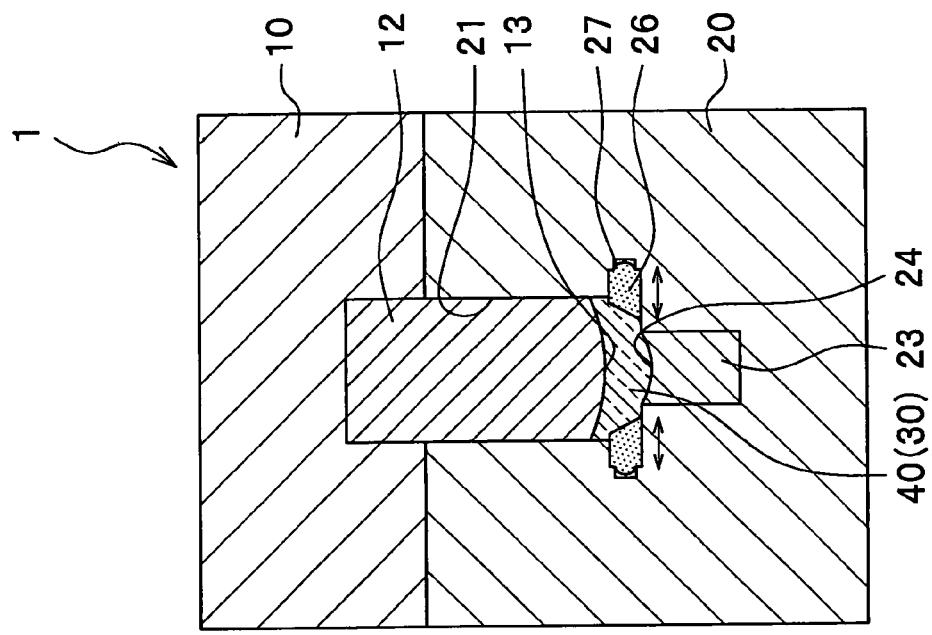
FIG. 3B is a side cross sectional view showing a status where the plastic material is processed with compression molding in the plastic lens manufacturing method using the plastic molding die according to the embodiment.

FIGS. 3A and 3B are views showing the plastic lens manufacturing method using the plastic molding die according to the embodiment.

FIG. 3A is a side cross sectional view showing a status where a plastic material is put in the plastic molding die, in the plastic lens manufacturing method using the plastic molding die according to the embodiment. FIG. 3B is a side cross sectional view showing a status where the plastic material is processed with compression molding in the plastic lens manufacturing method using the plastic molding die according to the embodiment.

The present invention will be explained using the plastic lens manufacturing method with compression molding of a polycarbonate plastic material as an example in the embodiment.

First, as shown in FIG. 3A, upper main die 10 and lower main die 20 are separated upward and downward, respectively. Then, plastic material 40 is put in inserting hole 21 of lower main die 20 and placed on upper end surface 24 of lower connection 23.

Next, after softening plastic material 40 by heating up the material to a temperature equal to or higher than a glass-transition temperature of the material through, for example, heating of lower main die 20, as shown in FIG. 3B, upper main die 10 and lower main die 20 are combined by lowering upper main die 10 toward lower main die 20, thereby inserting upper connection 12 of upper main die 10 into inserting hole 21 of lower main die 20.

With the above process, plastic material 40 is put in cavity 30 provided between bottom end surface 13 of upper connection 12 and upper end surface 24 of lower connection 23, and by compressing the material with upper connection 12, plastic material 40 reaches saturation through deformation within cavity 30.

Here, lower end surface 13 of upper connection 12 corresponds to a shape of a concave optical surface, and also upper end surface 24 of lower connection 23 corresponds to a shape of a convex optical surface. Therefore, plastic material 40 which is saturated within cavity 30 has a thickness corresponding to a distance between lower end surface 13 of upper connection 12 and upper end surface 24 of lower connection 23. Thus, a plastic lens having concave and convex optical surfaces is formed.

Also, rubber ring 26 is deformed outward by a stress of plastic material 40 when plastic material 40 is compressed. Specifically, an inner diameter of rubber ring 26 is enlarged, and an outer perimeter of rubber ring 26 protrudes into clearance groove 27 according to the enlargement of the diameter.

Meanwhile, since rubber ring 26 has a heat resistant temperature higher than the glass-transition temperature of plastic material 40, rubber ring 26 is prevented from degradation due to contact with plastic material 40 which is heated up to a temperature equal to or higher than the glass-transition temperature.

After that, plastic material 40 is cooled to a temperature equal to or less than the glass-transition temperature within cavity 30. In this case, plastic material 40 is cooled down within the cavity 30. However, since a restoring force of the deformed rubber ring 26 works on plastic material 40, a pressurized state of plastic material 40 is maintained, that is, the pressurized state of plastic material 40 by bottom end surface 13 of upper connection 12 and upper end surface 24 of lower connection 23 is maintained. Therefore, a close contact of plastic material 40 with the molding portion for forming the optical surface is maintained. As a result, an accurate molding of the optical surface can be achieved.

Meanwhile, in plastic molding die 1 according to the embodiment, rubber ring 26 is arranged on a portion of inner surface of cavity 30 other than bottom end surface 13 of upper connection 12 and upper end surface 24 of lower connection 23, which are the molding portions for molding the optical surface. Therefore, there is no chance that the optical surface is molded with a soft and unstable elastic body, resulting in increase of a molding accuracy of the optical surface.

In addition, since bottom end surface 13 of upper connection 12 and upper end surface 24 of lower connection 23, which are the molding portions for molding the optical surface, are not displaced after compression molding of plastic material 40, thereby a distance between bottom end surface 13 and upper end surface 24 is maintained to be constant, a thickness of the molded plastic lens can be maintained to be constant and reproducible.

Further, in the embodiment, a degree of rubber hardness of rubber ring 26 is from 70 to 90. Then, when plastic material 40 is cooled, the restoring force of rubber ring 26 efficiently works on plastic material 40. As a result, the pressurized state of plastic material 40 is certainly maintained.

Here, if the degree of rubber hardness of rubber ring 26 is less than 50, there is a possibility that rubber ring 26 does not have a sufficient restoring force against plastic material 40. On the other hand, if the degree is more than 100, there is a possibility that rubber ring 26 can not enlarge the diameter when plastic material 40 is compressed. Therefore, as with the embodiment, if the degree of rubber hardness is from 70 to 90, plastic material 40 can be effectively compressed.

As described above, plastic material 40 is taken out from inserting hole 21 of lower main die 20 by separating upper main die 10 and lower main die 20 after cooling plastic material 40 to a temperature equal to or less than the glass-transition temperature of the material after compression molding. Then, a plastic lens is completed after working upon a circular periphery of plastic material 40.

Thus, according to plastic molding die 1 of the present invention, since a part of inner surface of cavity 30 is configured with an elastic body of rubber ring 26, the restoring force of the deformed rubber ring 26 works on plastic material 40 being cooled within cavity 30 when plastic material 40 is processed with compression molding. Through the above process, since the pressurized state of plastic material 40 is maintained even if the material shrinks by the cooling, a status of plastic material 40 which is closely contacted with the molding portion of the optical surface within cavity 30 can also be maintained. As a result, the molding accuracy of the plastic lens with compression molding can be increased without making a structure of the molding die complex.

Figure 4A:
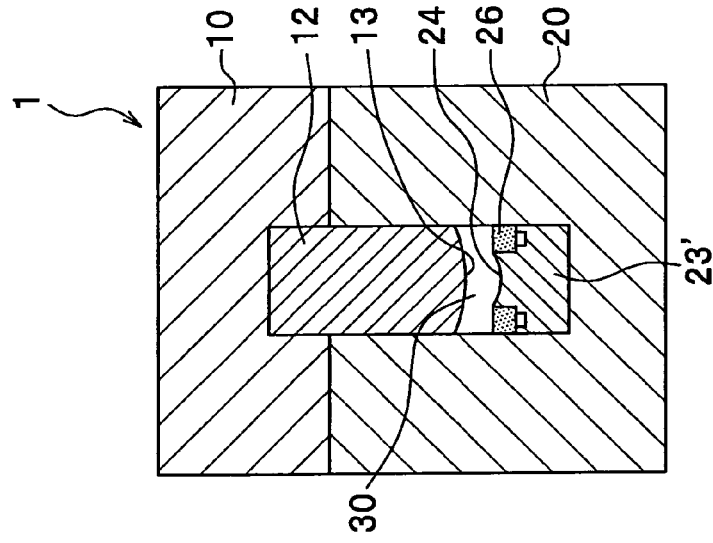
FIG. 4A is a side cross sectional view showing a configuration where a bottom portion of a rubber ring is engaged with a lower connection, in another configuration of a plastic molding die according to an embodiment of the present invention.
Figure 4B:
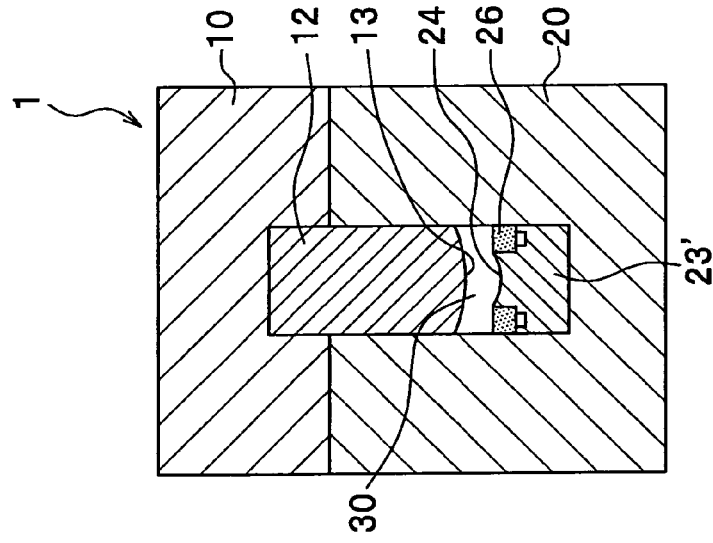
FIG. 4B is a side cross sectional view showing a configuration where the rubber ring is engaged with the lower connection, in another configuration of the plastic molding die according to an embodiment of the present invention.
Figure 4C:
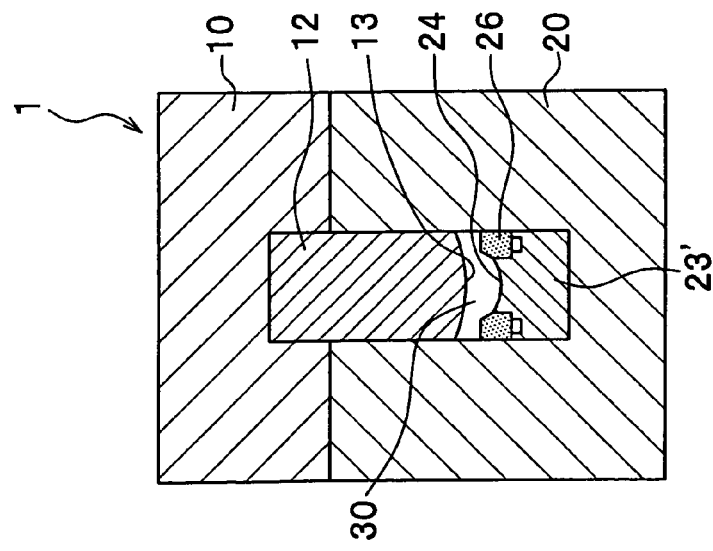
FIG. 4C is a side cross sectional view showing a configuration where the rubber ring is engaged with the upper connection, in other configuration of the plastic molding die according to an embodiment of the present invention.
Figure 5:
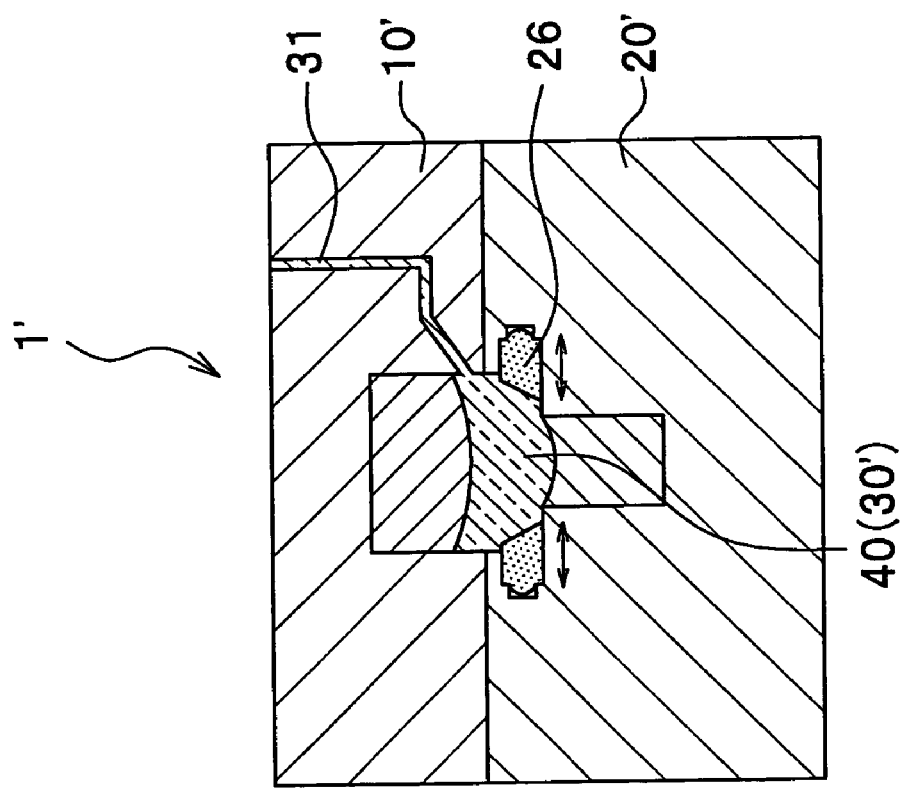
FIG. 5 is a side cross sectional view showing a configuration of injection molding of a plastic material, in another configuration of the plastic molding die according to an embodiment of the present invention.

The embodiment of the present invention has been explained. However, the present invention is not limited to the embodiment described above. FIGS. 4A, 4B, and 4C are views showing other configurations of the plastic molding die according to the embodiment. FIG. 4A is a side cross sectional view showing a configuration where a bottom portion of a rubber ring is engaged with a lower connection. FIG. 4B is a side cross sectional view showing a configuration where the rubber ring is engaged with the lower connection. FIG. 4C is a side cross sectional view showing a configuration where the rubber ring is engaged with an upper connection. FIG. 5 is a side cross sectional view showing a configuration of injection molding of a plastic material, in another configuration of the plastic molding die according to the embodiment.

For example, in the embodiment, as shown in FIG. 1B, the outer perimeter portion of rubber ring 26 is engaged with engagement groove 25 which is provided on the inner perimeter side surface of a bottom portion of inserting hole 21. However, as shown in FIG. 4A, it is possible to configure the plastic molding die so that a bottom portion of rubber ring 26 is engaged with an outer perimeter portion of upper end surface 24 of lower connection 23'. In this configuration, disposal of a groove on the inner perimeter side surface of inserting hole 21 is unnecessary, thereby resulting in a simple configuration of lower main die 20.

In addition, as shown in FIG. 4B and FIG. 4C, it may be possible to configure the plastic molding die so that rubber ring 26 is engaged with an outer perimeter portion of upper end surface 24 of lower connection 23', wherein upper end surface 24 of lower connection 23' and an upper end surface of rubber ring 26 are coplanar, and that rubber ring 26 is engaged with an outer perimeter portion of bottom end surface 13 of upper connection 12', wherein bottom end surface 13 of upper connection 12' and a lower end surface of rubber ring 26 are coplanar. In these configurations, as with the configuration shown in FIG. 4A, it is not necessary to provide a groove on the inner perimeter side surface of inserting hole 21, thereby resulting in a simple configuration of lower main die 20. In addition, since rubber ring 26 does not protrude into cavity 30, plastic material 30 can be molded efficiently using a full space of cavity 30.

Further, as shown in FIG. 3A and FIG. 3B, plastic molding die 1, where plastic material 40 which is put in lower main die 20 is processed with compression molding by combining upper main die 10 and lower main die 20, has been explained in the embodiment. In addition, as shown in FIG. 5, a configuration of the present invention can also be applied to plastic molding die 1 for injection molding, where a melted plastic material 40 is flown into cavity 30 through runner 31, wherein cavity 30 is formed with combination of main dies 10' and 20'. Namely, by arranging rubber ring 26 within cavity 30' of plastic molding die 1' for injection molding, a pressurized state of plastic material 40 is maintained with the restoring force of rubber ring 26 when plastic material 40 is cooled after injection molding. Through the above process, since a close contact of plastic material 40 with the molding portion for forming the optical surface is maintained, an accurate molding of the optical surface can be achieved with the injection molding.

In the embodiment, as shown in FIGS. 1A and 1B, connections 12, 23 are engaged with upper main die 10 and lower main die 20, respectively. However, it may also be possible to form cavity 30 between upper main die 10 and lower main die 20 without using connections 12, 23.

In addition, a shape of the clearance for rubber ring 26 is not limited to a groove. A space formed between rubber ring 26 and lower main die 20 by, for example, a concave portion and the like may also be available for the clearance.

Further, a clearance formed by providing a space (for example, foamed portion) within rubber ring 26 may also be available for the clearance. If a large deformation of rubber ring 26 is not needed, the clearance is unnecessary.

Furthermore, an elastic body arranged on a part of the inner surface of cavity 30 is not limited to rubber ring 26, but various kinds of elastic body can be used. The shape of the elastic body is also not limited to a ring shape.

What is claimed is:

1. A plastic molding die comprising a first main die having a concave optical surface and a second main die having a convex optical surface and provided with a cavity therebetween where a plastic material is put in,
    wherein a part of an inner surface of the cavity other than a molding portion comprises an elastic body which is unitary and directly contacts the plastic material, the molding portion corresponding to a molding surface of a molded product being disposed on the inner surface of the cavity and an outer periphery of the molded product being defined by the inner surface of the cavity; and
    wherein the elastic body is engaged with an engagement groove which is disposed on the inner surface of the cavity and has a circular shape
    wherein the engagement groove includes a clearance groove at a back of the engagement groove for facilitating an elastic deformation of the elastic body with ease due to elasticity of the elastic body.

2. The plastic molding die according to claim 1,
    wherein the elastic body comprises a rubber material.

3. The plastic molding die according to claim 2,
    wherein the rubber material comprises a heat resistant rubber material.

4. The plastic molding die according to claim 1,
    wherein the plastic molding die is a molding die for compression molding.

5. The plastic molding die according to claim 1,
    wherein the elastic body has an upper temperature limit higher than a glass-transition temperature of the plastic material.

6. The plastic molding die according to claim 4,
    wherein the elastic body has an upper temperature limit higher than a glass-transition temperature of the plastic material.

7. The plastic molding die according to claim 2,
    wherein a degree of rubber hardness of the elastic body is from 50 to 100.

8. The plastic molding die according to claim 3,
    wherein a degree of rubber hardness of the elastic body is from 50 to 100.

9. The plastic molding die according to claim 4,
    wherein a degree of rubber hardness of the elastic body is from 50 to 100.

10. The plastic molding die according to claim 5,
    wherein a degree of rubber hardness of the elastic body is from 50 to 100.

11. The plastic molding die according to claim 1,
    wherein the elastic body has an open center space.

12. The plastic molding die according to claim 1, wherein the plastic molding die is a molding die for molding an optical element.

13. A plastic molding die comprising:
    a first main die having a first connection provided with a first molding portion for molding a first mold surface of a molded product, wherein the first molding portion is a concave optical surface;
    a second main die comprising an inserting hole for forming a cavity with the first molding portion by engaging with the first connection, and a second connection provided with a second molding portion for forming a second mold surface of the molded product, wherein the second molding portion is a convex optical surface, and wherein the first main die and the second main die have a cavity provided therebetween for insertion of a plastic material; and
    an elastic body which is unitary and directly contact the plastic material of the molded product, engaging with an engagement groove which is disposed on a surface of one of the first main die or the second main die and has a circular shape, other than the first molding portion or the second molding portion of an inner surface of the inserting hole,
    wherein the engagement groove include a clearance groove at a back of the engagement groove for facilitating an elastic deformation of the elastic body with ease due to elasticity of the elastic body,
    wherein an outer periphery of the molded product is defined by the inner surface of the inserting hole.

14. The plastic molding die according to claim 13,
    wherein the engagement groove is disposed as a groove along a periphery of one of the first molding portion or the second molding portion, and
    wherein the elastic body is configured with a loop rubber material extending, while engaging with the engagement groove, between a periphery of the first molding portion and the periphery of the second molding portion to form a surface of the molded product other than the first molding surface and the second molding surface.

15. The plastic molding die according to claim 13, wherein the first connection comprises a protrusion which extends outward from a body of the first main die.

16. The plastic molding die according to claim 15, wherein the protrusion is cylindrical.

17. The plastic molding die according to claim 15, wherein the first molding portion is disposed at the distal end of the first connection.

* * * * *